US008671811B2

(12) United States Patent  
Rybka (10) Patent No.: US 8,671,811 B2  
(45) Date of Patent: Mar. 18, 2014

(54) PIVOTING SAW SYSTEM (75) Inventor: Matthew Michael Rybka, Hoffman Estates, IL (US)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 13/249,641

(22) Filed: Sep. 30, 2011

(65) Prior Publication Data  
US 2013/0081526 A1 Apr. 4, 2013

(51) Int. Cl.  
B26D 1/14 (2006.01)

(52) U.S. Cl.  
USPC ......... 83/477.1; 83/477.2; 83/581; 125/13.01

(58) Field of Classification Search  
USPC ............. 83/471.3, 477.2, 581, 435.11, 477.1, 83/471, 663, 651, 676, 486, 483; 125/13.01, 13.03, 12, 17, 16.01  
See application file for complete search history.

(56) References Cited

U.S. PATENT DOCUMENTS

| | | | |
|---|---|---|---|
| 1,703,179 A | 2/1929 | Skolnik | |
| 1,848,330 A | 3/1932 | Emmons | |
| 3,007,499 A | 11/1961 | Dobslaw | |
| 4,881,437 A * | 11/1989 | Macksoud | ................... 83/477.2 |
| 5,414,935 A | 5/1995 | Braunbach et al. | |
| 5,862,732 A | 1/1999 | Itzov | |
| 5,943,932 A | 8/1999 | Sberveglieri | |
| 6,067,885 A | 5/2000 | Brunson et al. | |
| 6,276,990 B1 * | 8/2001 | Greenland | ....................... 451/11 |
| 6,932,075 B1 * | 8/2005 | Tsao | ........................... 125/13.01 |
| 7,140,361 B1 | 11/2006 | Chao-Huan | |
| 7,387,056 B2 | 6/2008 | Higuchi | |
| 7,404,350 B2 * | 7/2008 | Chuang | ........................... 83/438 |
| 7,552,725 B2 * | 6/2009 | Chen et al. | ................. 125/13.01 |
| 7,574,950 B2 | 8/2009 | Hetcher et al. | |
| 2002/0100353 A1 * | 8/2002 | Lee | ................................. 83/581 |
| 2006/0266189 A1 | 11/2006 | Chen | |
| 2010/0050446 A1 | 3/2010 | Heflin et al. | |
| 2010/0107840 A1 | 5/2010 | Rybka et al. | |
| 2010/0116111 A1 | 5/2010 | Rybka et al. | |
| 2010/0263511 A1 * | 10/2010 | Firth | .............................. 83/473 |
| 2011/0067542 A1 * | 3/2011 | Lacy | ........................... 83/471.3 |

OTHER PUBLICATIONS

International Search Report in corresponding PCT application (i.e., PCT/US2012/057818), mailed Dec. 3, 2012 (11 pages).

* cited by examiner

Primary Examiner — Omar Flores Sanchez  
(74) Attorney, Agent, or Firm — Maginot, Moore & Beck (57) ABSTRACT

A portable table saw in one embodiment includes a base, a first support post and a second support post, each of the first and second support post extending upwardly to a location higher than the base, at least one support rail having a first end portion supported by the first support post and a second end portion supported by the second support post, a saw movably mounted to the at least one support rail at a location between the first end portion and the second end portion, the saw positioned above the base and movable along the at least one support rail, and a first pivot mechanism configured to pivot the saw with respect to the base.

16 Claims, 6 Drawing Sheets

PIVOTING SAW SYSTEM

FIELD OF THE INVENTION

This patent relates generally to the field of devices used to support and shape work-pieces and particularly to a device for supporting and cutting work-pieces.

BACKGROUND

Laminate flooring is a popular flooring product due to its ease of installment as well as its performance. Additionally, the various designs which are available for laminate flooring enhance its popularity with consumers. The designs include wood-grain patterns, slate, marble, mosaic, and granite. Additionally, a number of specialized products have been designed to ease installation of laminate flooring. Such products include transition strips, end caps, stair nosings, moldings and baseboards.

When laminates were first introduced, there was only one method of installation. The laminates were produced in a "tongue and groove" design. When installing the laminate, the tongue and grooves were glued together, then clamped and left to dry. Manufacturers have since developed flooring that requires no glue at all.

Accordingly, installation of laminate flooring has been significantly simplified. One difficult aspect of installation that remains, however, is cutting the laminate flooring to fit within a particular area. Most laminates are provided in planks that are 7-8 inches wide and about 4 foot long. Depending upon the width of a room, the final course of planks may need to be ripped to the appropriate width. Moreover, the lengths of the planks at opposing walls need to be trimmed. Additionally, miter cuts may be required to contour the planks to fit the contours of a particular room.

Once the flooring has been installed, a baseboard or trim is typically installed on the walls adjacent to the flooring. At locations where walls meet, the trim is generally mitered so as to form a finished corner. Miter cuts of this type require a different orientation of the work piece compared to miter cuts on flooring work pieces. A typical flooring saw, however, does not provide the requisite clearing to accommodate trim pieces of more than about an inch.

Traditionally, a number of different types of saws have been used to make the necessary miter and rip cuts in laminate floors and baseboards. Such saws include table saws, hand saws, jig saws and circular saws. Each of these types of saws provides some advantages. A table saw gives very precise cuts and can be used to rip cut a work-piece. Additionally, table saws can be configured to provide angled cuts by angling the work-piece and/or the saw blade. Table saws can also accommodate baseboards and trim pieces which can have heights of up to seven inches. Table saws, however, even the so called "portable" table saws, are large and heavy. Thus, an installer must either undertake the difficulty of transporting the table saw to a location near the area where the laminate and trim is to be installed or carry each piece of laminate and trim back and forth from the work area to the saw location. Additionally, many homeowners attempt to install a laminate floor on their own. In the event the homeowner does not own a table saw, a different approach is needed.

Hand saws are, in stark contrast to table saws, extremely mobile. Hand saws are also, however, labor intensive. Thus, while handsaws may reasonably be used to make cuts of a few feet, the large number of planks that may need to be cut for a particular installation presents a daunting challenge to those using handsaws. Moreover, handsaws are generally not as accurate as table saws which can result in unacceptable joints in trim work.

Jig saws and circular saws are generally much more "portable" than table saws and greatly facilitate making a large number of cuts. Depending upon the particular jigs available to an installer, however, these saws still do not provide the accuracy achievable with a table saw. Thus, while professional installers may become very skilled with using a jig saw or circular saw, other users may generate an undesired amount of scrap as a result of erroneous cuts.

What is needed is a system which can be used to rip cut a work piece and to miter cut the work piece. What is further needed is a system which is portable so that it can be located at a work site. A further need is for a system that can provide the required portability while providing accurate cuts. Yet another need is for a system that can accommodate work pieces of increased height.

SUMMARY

In accordance with one embodiment of the disclosure, a portable table saw includes a base, a first support post and a second support post, each of the first and second support post extending upwardly to a location higher than the base, at least one support rail having a first end portion supported by the first support post and a second end portion supported by the second support post, a saw movably mounted to the at least one support rail at a location between the first end portion and the second end portion, the saw positioned above the base and movable along the at least one support rail, and a first pivot mechanism configured to pivot the saw with respect to the base.

In another embodiment, a saw system includes a base, a first support post and a second support post, each of the first and second support post extending upwardly to a location higher than the base, at least one support rail supported by the first support post at a first location and supported by the second support post at a second location, a saw movably mounted to the at least one support rail at a location between the first location and the second location, the saw positioned above the base and movable along the at least one support rail, and at least one pivot mechanism configured to pivot the saw with respect to the base.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the invention includes any alterations and modifications to the illustrated embodiments and includes further applications of the principles of the invention as would normally occur to one skilled in the art to which this invention pertains.

Figure 1:
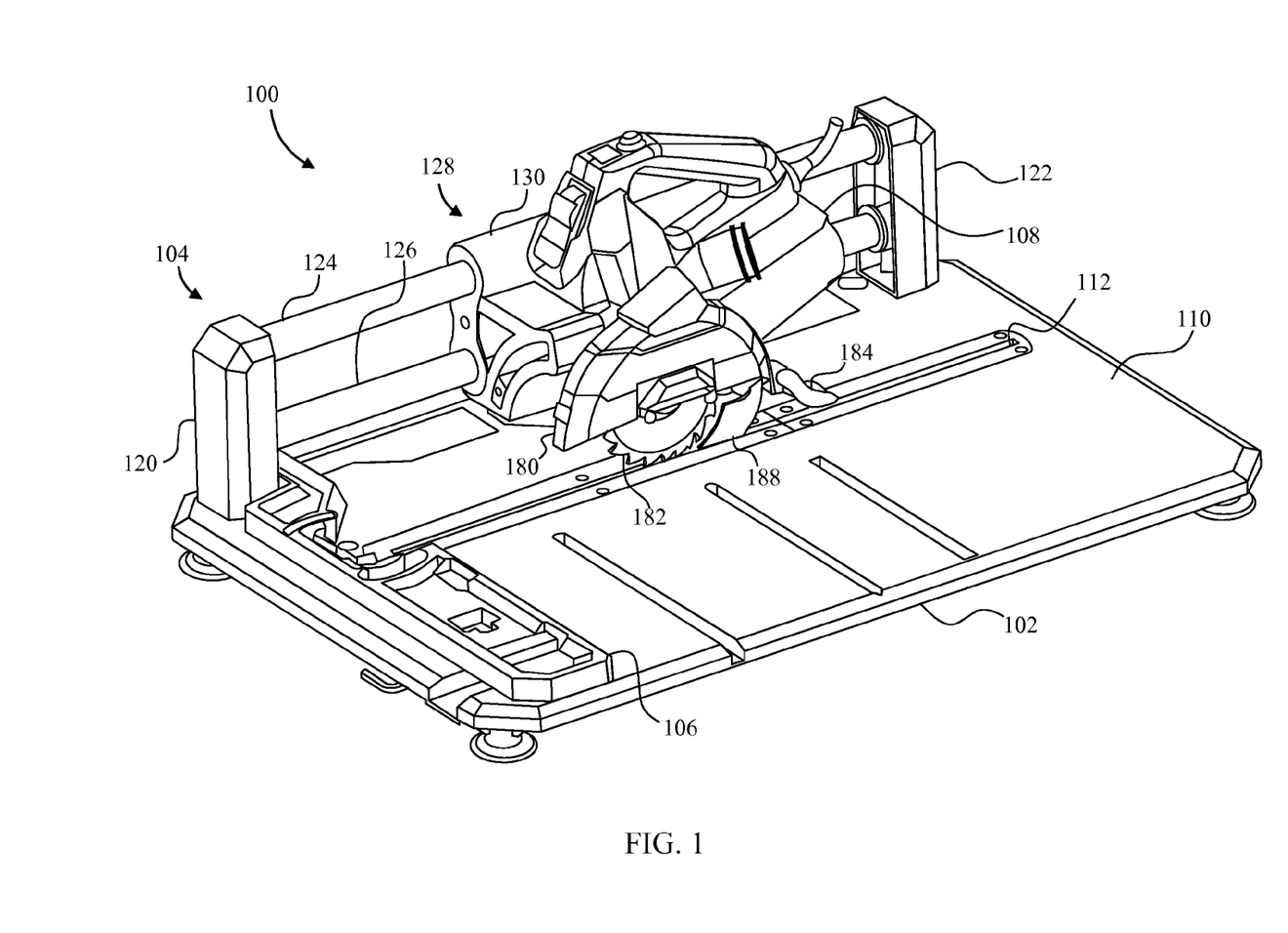
FIG. 1 depicts a perspective view of a power tool system in accordance with principles of the present invention.
Figure 2:
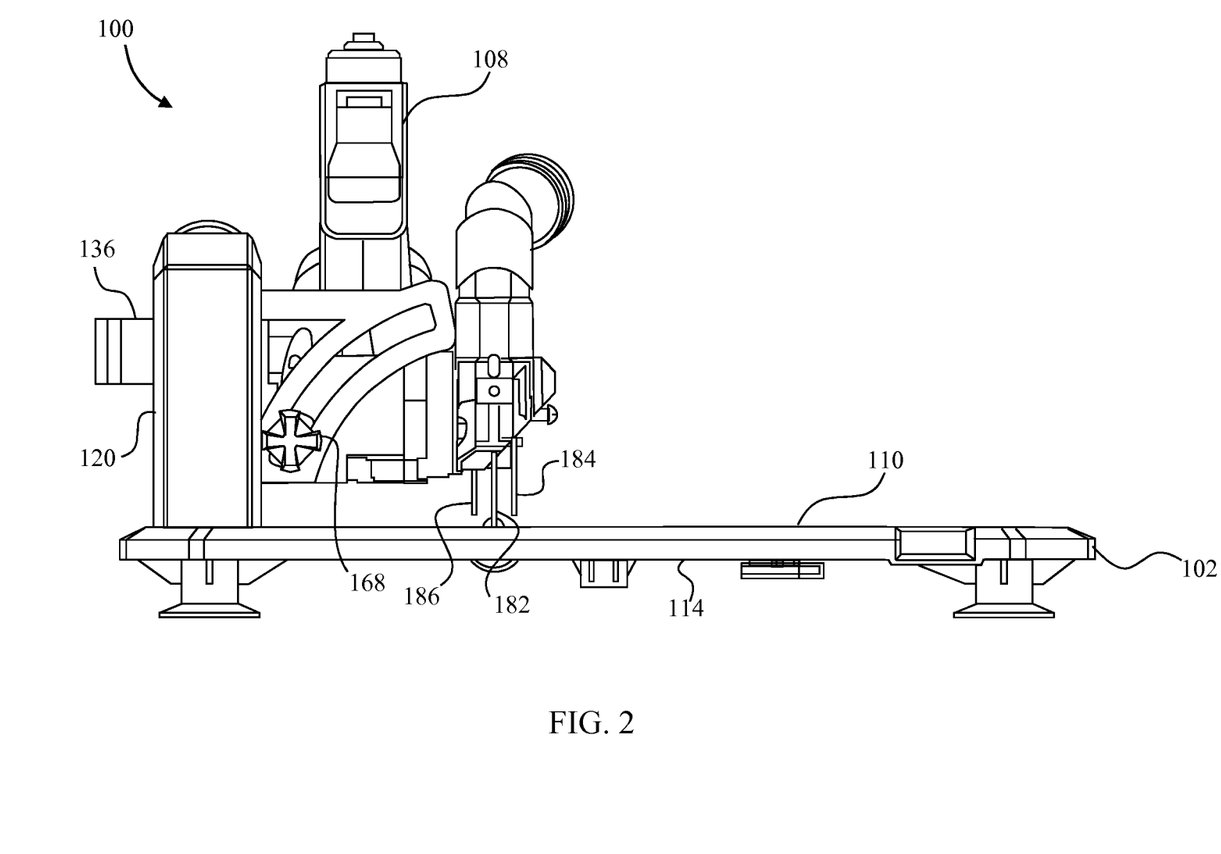
FIG. 2 depicts a front plan view of the system of FIG. 1.

FIGS. 1 and 2 show a power tool system 100. The system 100 includes a base 102, a support structure 104 and a fence 106. A power tool 108 is supported by the support structure 104. The base 102 includes a work piece support surface 110 which defines a support plane. A blade slot 112 extends completely through the work piece support surface 110 to a lower surface 114.

The fence 106 is removably supported on the work piece support surface 110. The fence 106 and the work piece support surface 110 may be configured to allow the fence 106 to be positioned in a number of orientations. By way of example, the fence 106 and the work piece support surface 110 may be configured like the fence and work piece support surface disclosed in U.S. Patent Application Publication No. 2010/0116111, published on May 13, 2010.

The support structure 104 in the embodiment of FIGS. 1 and 2 includes two support posts 120 and 122, two support rails 124 and 126, and a pivot mechanism 128. The support posts 120 and 122 are fixedly mounted to the base 102 and extend upwardly to a location above the support plane defined by the work piece support surface 110. The support post 120 supports the support rails 124 and 126 at one end of the support rails 124 and 126 while the opposite end of the support rails 124 and 126 is supported by the support post 122. The longitudinal axes of the support rails 124/126 are parallel to the longitudinal axis of the blade slot 112.

Figures 3, 4, 5:
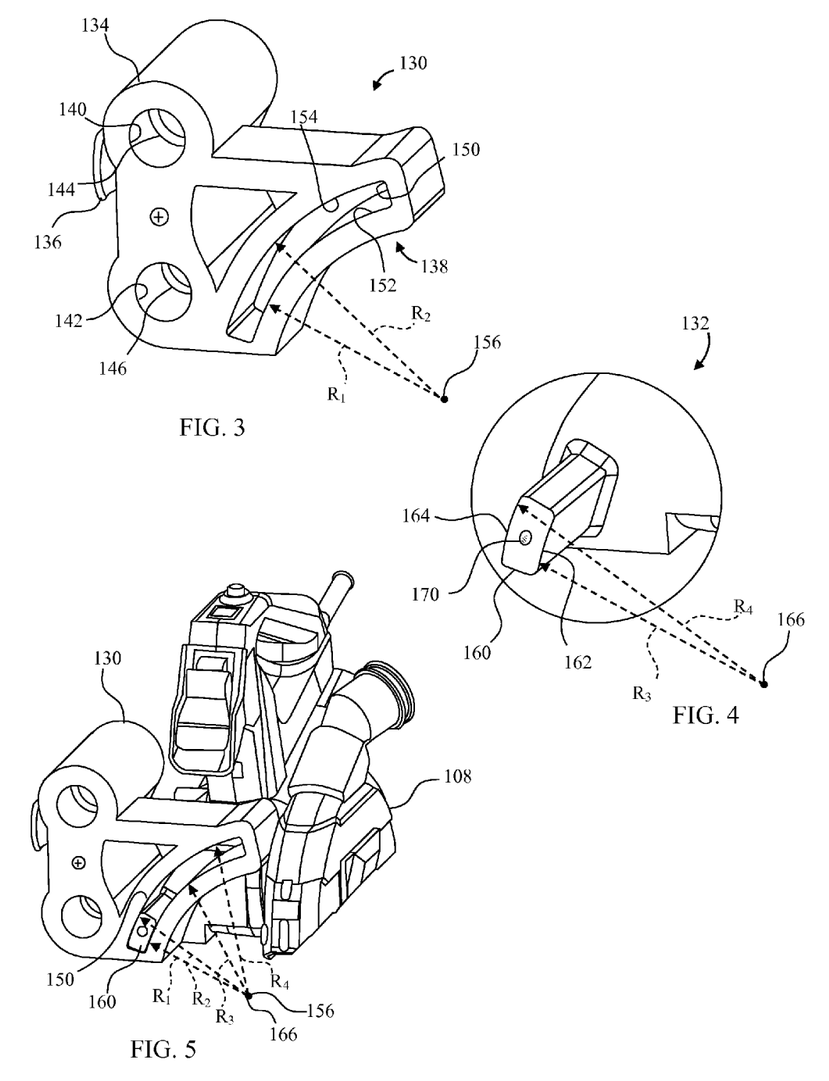
FIG. 3 depicts a perspective view of the base portion of the pivot mechanism of the system of FIG. 1.
FIG. 4 depicts a perspective view of the guide follower portion of the pivot mechanism of the saw system of FIG. 1.
FIG. 5 depicts a perspective view of the guide follower portion of FIG. 4 inserted within the base portion of FIG. 3.

The pivot mechanism 128, shown in additional detail in FIGS. 3 and 4, includes a pivot base member 130 and a pivoting member 132. The base member 130 includes a support bracket 134, a clamp lever 136, and a guide portion 138. The support bracket 134 includes two bores 140 and 142 which slidingly receive the support rails 124 and 126, respectively (see FIG. 1). The clamp lever 136 is operatively connected to two clamp members 144 and 146 located within the bores 140 and 142. The clamp lever 136 is used to move the clamp members 144 and 146 between a first position whereat the clamp members 144 and 146 clamp the support rails 124 and 126, thereby positionally locking the bracket 134, and a second position whereat the clamp members 144 and 146 do not clamp the support rails 124 and 126, thereby allowing the bracket 134 to move along the support rails 124 and 126 between the support posts 120 and 122.

The guide portion 138 includes a guide slot 150. The guide slot 150 has an inner guide surface 152 and an outer guide surface 154. The inner guide surface 152 has a radius $R_1$ which has an origin 156. The outer guide surface 154 has a radius $R_2$ which shares the origin 156 with $R_1$.

The pivoting member 132 is fixedly attached to the power tool 108 and includes a guide follower portion 160 which includes two articulating guide surfaces 162 and 164 which are positioned within the guide slot 150 when the pivot mechanism 138 is assembled as shown in FIG. 5. The articulating guide surface 162 has a radius $R_3$ which has an origin 166. The articulating guide surface 164 has a radius $R_4$ which shares the origin 166 with $R_3$.

When the guide follower portion 160 is positioned within the guide slot 150 as shown in FIG. 5, the origin 156 is collocated with the origin 166. Additionally, $R_1$ is substantially identical to $R_3$ and $R_2$ is substantially equal to $R_4$. Accordingly, the guide follower portion 160 is tightly received within the guide slot 150. The inner and outer guide surfaces 152/154 and the articulating guide surfaces 162/164, however, are configured for articulating contact. Accordingly, the guide follower portion 160 may be moved within the guide slot 150.

When movement within the guide slot 150 is not desired, a locking member 168 (see FIG. 2) which is received within a locking bore 170 (see FIG. 4) in the guide follower portion 160 may be used to fix the location of the guide follower portion 160 within the guide slot 150. In one embodiment, the guide portion 138 is clamped between the locking member 168 and the power tool 108.

The power tool 108 in the embodiment of FIG. 1 is a power saw. Referring again to FIGS. 1 and 2, the power tool 108 includes a blade guard 180 which is configured to receive a blade 182. The power tool 108 thus defines a working portion plane in the form of a saw blade plane in which the blade 182 is positioned when mounted to the power tool 108. The power tool 108 further includes two kick-back pawls 184 and 186 which extend from the blade guard 180 and a riving knife 188 located at the rear of the blade guard 180.

The portable saw system 100 may be operated in accordance with the following example or variants thereof. Initially, the portable table saw system is configured substantially as depicted in FIG. 1. In FIG. 1, the fence 106 is positioned on the work piece support surface 110. The blade 182, when positioned within the saw blade plane, extends from the power tool 108 to within the blade slot 112. Additionally, the guide follower portion 160 of the pivot mechanism 128 is positioned within the slot and locked with the locking member 168 shown in FIG. 2.

The user can adjust the angle of the cut to be made on a work piece by first loosening the locking member 168 (FIG. 2). The power tool 108 is then pivoted about the base 102. Specifically, by applying an upward force (as viewed in FIG. 2) on the power tool 108, the guide follower portion 160 of the pivot mechanism 128 is forced along the guide slot 150. Because $R_1$ is substantially equal to $R_3$, and because $R_2$ is substantially equal to $R_4$, the power tool 108 pivots about a pivot axis on which the origins 156/166 (see FIGS. 3 and 4) are located.

The portable saw system 100 is configured such that the origins 156/166 are located at or about the intersection of the working portion plane defined by the power tool 108 and the support plane defined by the work piece support surface 110 at a location directly above the blade slot 112. Accordingly, as the power tool 108 pivots from the position of FIG. 2 to the position of FIG. 6, the saw blade 182 intersects the support plane at substantially the same location throughout the pivoting movement. Once the power tool 108 has been pivoted to the position of FIG. 6, the locking member 168 may be used to positionally fix the guide follower portion 160 within the guide slot 150.

Figure 6:
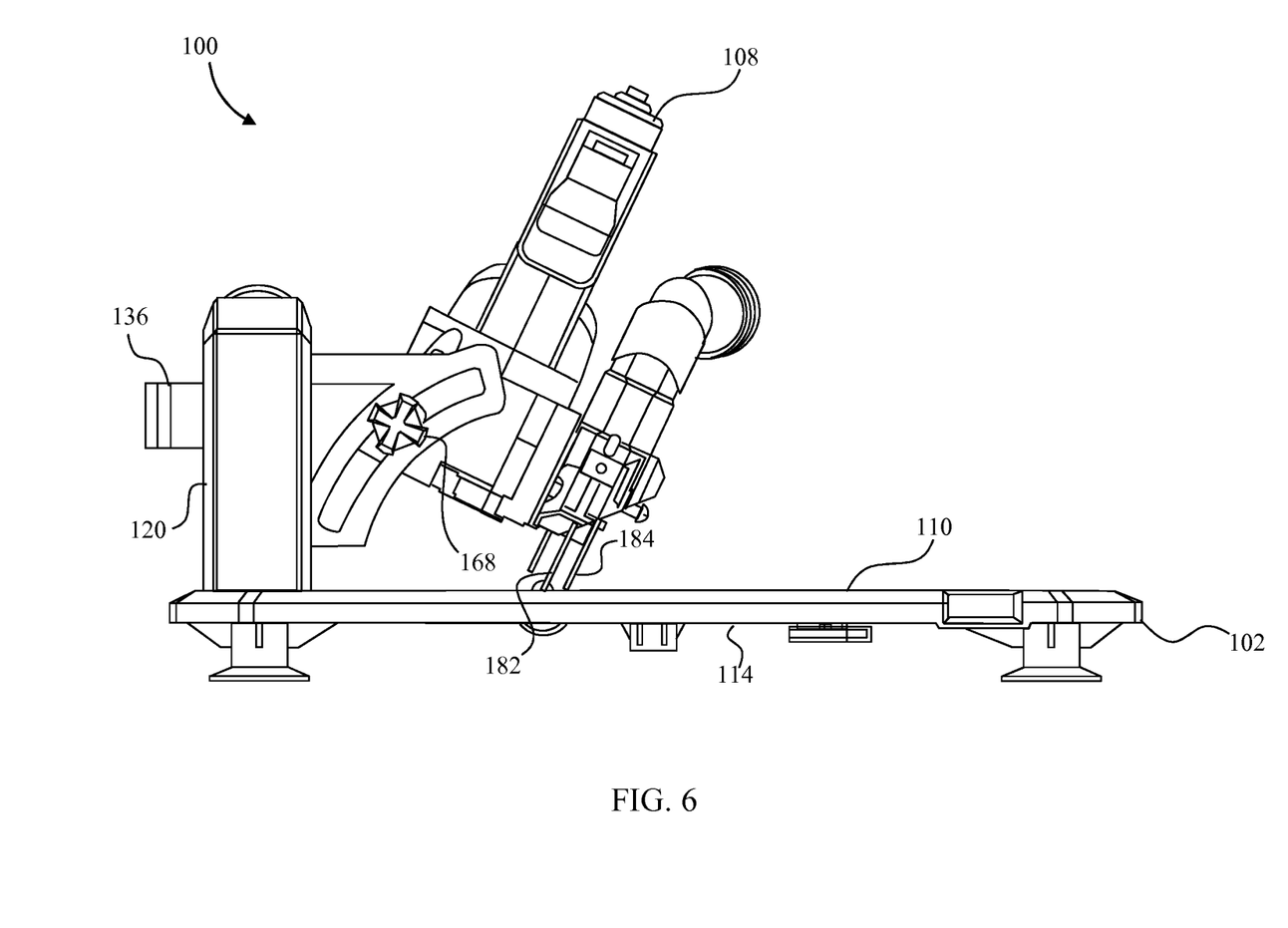
FIG. 6 depicts a front plan view of the flooring saw system of FIG. 1 with the power tool pivoted with respect to the base portion of the system.

Locking of the guide follower portion 160 within the guide slot 150 firmly locks the angle of the power tool 108 with respect to the base 102. The stability of the lock is enhanced because of the tight fit of the articulating guide surfaces 162/164 against the inner and outer guide surfaces 152/154.

A work piece may then be positioned on the work piece support surface 110 and against the fence 106. The clamp lever 136 may then be used to loosen clamp members 144/146 thereby allowing the power tool 108 to be moved along the support rails 124/126. Upon energizing the power tool 108, the user can force the power tool 108 along the support rails 124/126 until the blade 182 cuts into the work piece to the desired extent.

The portable saw system 100 thus provides a power tool 108 that is movably mounted to the support rails 124/126 and which may be moved along the support trails 124/126 or locked in a desired position using the clamp lever 136. Because the power tool 108 is pivotably mounted to the support rails 124/126 by the pivot mechanism 128, the power tool 108 may be locked at a variety of angles with respect to the base 102 to allow angled cuts on a work piece.

Figure 7:
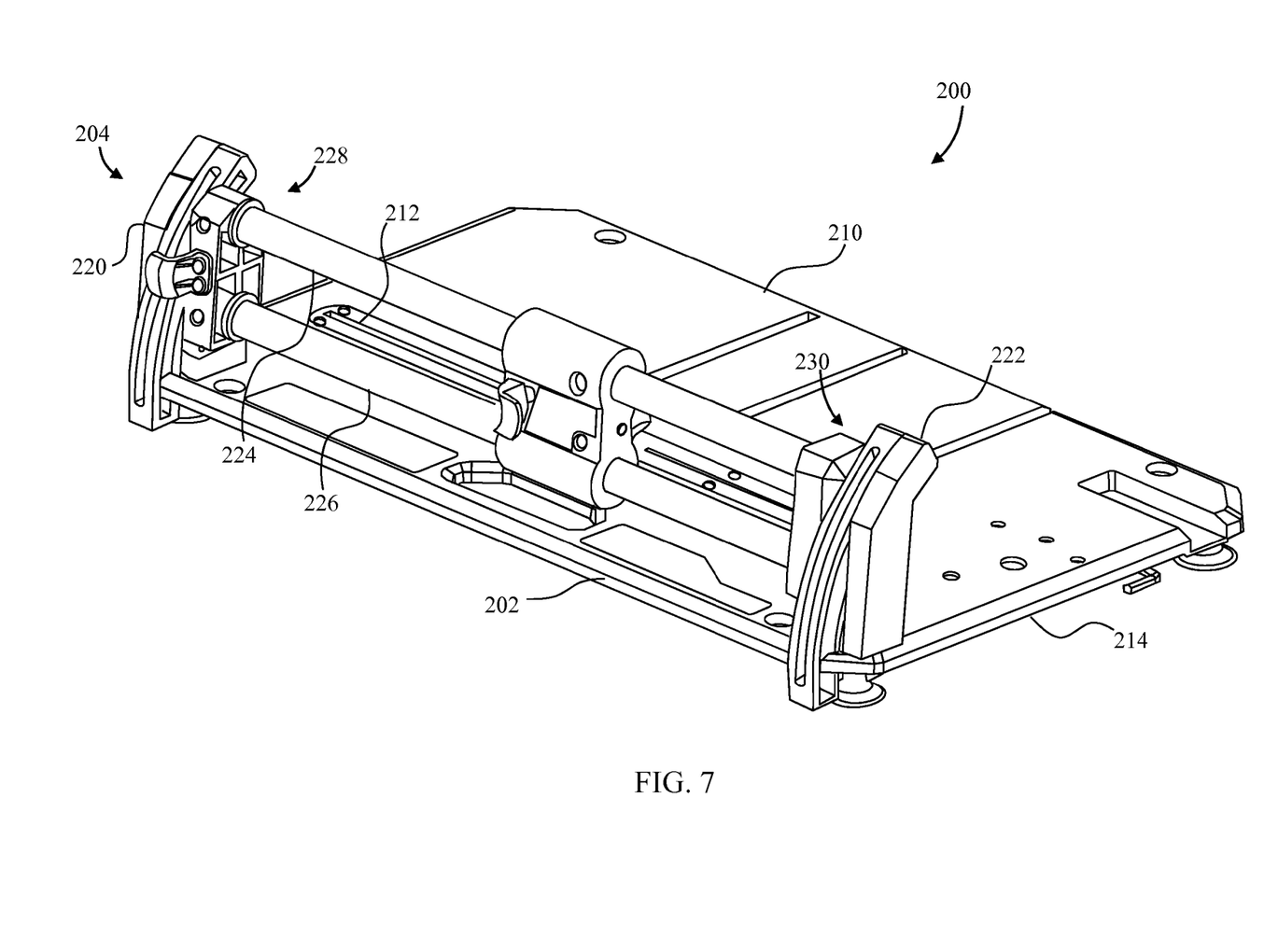
FIG. 7 depicts a perspective view of a power tool system in accordance with principles of the invention, wherein the power tool is removed and the support rails are pivoted using two pivot mechanisms located at opposite ends of the support rails.
Figure 8:
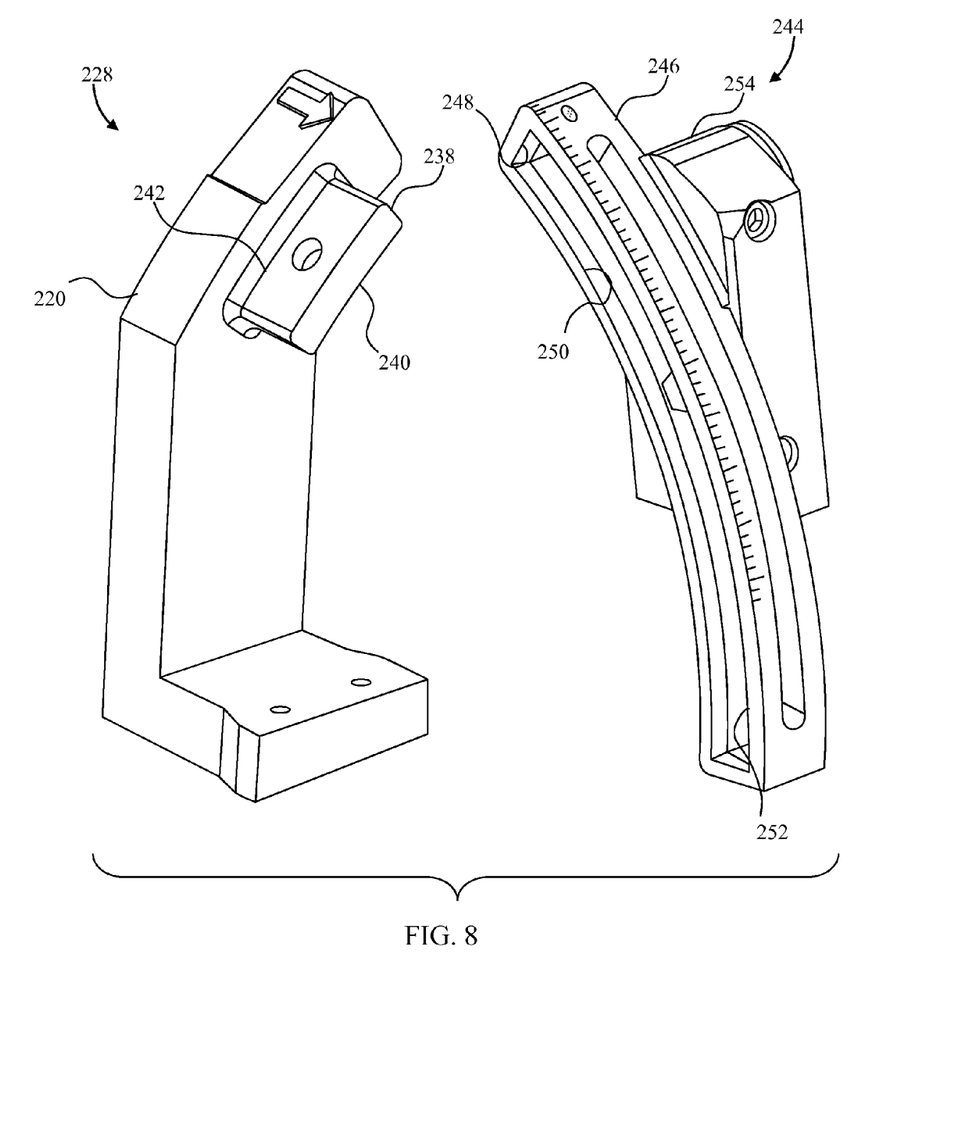
FIG. 8 depicts a laid open perspective view of a pivot mechanism of FIG. 7.

If desired, the location of a pivot mechanism may be modified while maintaining various advantages of the power saw system 100. By way of example, FIG. 7 depicts an alternative power saw system 200. The power tool system 200 includes a base 202 and a support structure 204. A fence (not shown) such as the fence 106 may be used with the power tool system 200 and a power tool (not shown) may supported by the support structure 204. The base 202 includes a work piece support surface 210 which defines a support plane. A blade slot 212 extends completely through the work piece support surface to a lower surface 214.

The support structure 204 in the embodiment of FIG. 6 includes two support posts 220 and 222, two support rails 224 and 226, and two pivot mechanisms 228 and 230. The support posts 220 and 222 are fixedly mounted to the base 202 and extend upwardly to a location above the support plane defined by the work piece support surface 210.

The pivot mechanisms 228 and 230 are substantially mirror images of each other, and are described with reference to the pivot mechanism 228. The pivot mechanism 228 includes a guide member 238 (see FIG. 7) which is fixedly attached to the support post 220. The guide member 238 has an inner guide surface 240 and an outer guide surface 242. The pivot mechanism 228 further includes a pivoting member 244 that includes a guide follower portion 246 with a slot 248 which includes two articulating guide surfaces 250 and 252. The pivot mechanism further includes a bracket 254 which supports an end portion of the support rails 224/226.

The radii of curvature of the inner and outer guide surfaces 240/242 and the articulating guide surfaces 250/252 are configured in the same manner as the inner and outer guide surfaces 150/152 and the articulating guide surfaces 162/164. Accordingly, the origins of the radii of curvature of the inner and outer guide surfaces 240/242 and the articulating guide surfaces 250/252 are collocated when the pivot mechanism 228 is assembled.

Additionally, the blade slot 212 is parallel to and spaced apart from the support rails 224/226 such that the origin of the radii of curvature of the inner and outer guide surfaces 240/242 and the articulating guide surfaces 250/252 is at or about directly above the blade slot 212 in the support plane defined by the work piece support surface 210. Accordingly, the pivot mechanisms 228 and 230 may be used to pivot the support rails 224/226 about a pivot axis that is located at or about directly above the center of the blade slot 212 in the support plane.

In a further embodiment, in addition to the power tool and the support rails, the support posts may also be pivoted. In such an embodiment, which may be otherwise substantially the same as the embodiments described above, the location of the pivot mechanisms is modified such that one portion of the pivot mechanism is fixed to the base of a power tool system and another portion of the pivot mechanism that is fixed to the support posts.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A portable saw system comprising:
 a base;
 a first support post and a second support post, each of the first and second support post extending upwardly to a location higher than the base;
 at least one support rail having a first end portion supported by the first support post and a second end portion supported by the second support post;
 a saw movably mounted to the at least one support rail at a location between the first end portion and the second end portion, the saw positioned above the base and movable along the at least one support rail; and
 a first pivot mechanism configured to pivot the saw with respect to the base, wherein:
 the saw defines a saw blade plane;
 the base defines a support plane; and
 the first pivot mechanism is configured to pivot the saw with respect to the base about a pivot axis defined by the intersection of the saw blade plane and a plane parallel to the support plane.

2. The portable saw of claim 1, wherein the first pivot mechanism comprises:
 at least one arcuate guide surface having a first radius of curvature centered on the pivot axis;
 a guide follower configured for movement along the at least one arcuate guide surface; and
 a locking mechanism configured to positionally fix the guide follower with respect to the at least one arcuate guide surface.

3. The portable saw of claim 2, wherein:
 the first pivot mechanism comprises a guide slot including the at least one arcuate guide surface;
 the guide follower is received within the guide slot; and
 the guide follower includes a first articulating surface configured to articulate with the at least one arcuate guide surface.

4. The portable saw of claim 3, wherein the first articulating surface is an arcuate surface having a second radius of curvature centered on the pivot axis.

5. The portable saw of claim 4, wherein the at least one arcuate guide surface comprises:
 a first arcuate guide surface configured to articulate with the first articulating surface; and
 a second arcuate guide surface configured to articulate with a second articulating surface of the guide follower.

6. The portable table saw of claim 1, wherein the saw is mounted to the at least one support rail by the first pivot mechanism.

7. The portable saw of claim 1, wherein:
 a first portion of the first pivot mechanism is fixedly connected to the first support post; and
 a second portion of a second pivot mechanism is fixedly connected to the second support post.

8. The portable saw of claim 7, wherein:
 the first support post is fixedly connected to the base; and
 the second support post is fixedly connected to the base.

9. A saw system comprising:
 a base;

a first support post and a second support post, each of the first and second support post extending upwardly to a location higher than the base;

at least one support rail supported by the first support post at a first location and supported by the second support post at a second location;

a saw movably mounted to the at least one support rail at a location between the first location and the second location, the saw positioned above the base and movable along the at least one support rail; and at least one pivot mechanism configured to pivot the saw with respect to the base, wherein:

the saw defines a saw blade plane;

the base defines a support plane; and the at least one pivot mechanism is configured to pivot the saw with respect to the base about a pivot axis defined by the intersection of the saw blade plane and a plane parallel to the support plane.

10. The saw of claim 9, wherein the at least one pivot mechanism comprises:

a first arcuate guide surface having a first radius of curvature with an origin on the pivot axis;

a guide follower configured for movement along the at least one arcuate guide surface; and a locking mechanism configured to positionally fix the guide follower with respect to the at least one arcuate guide surface.

11. The saw of claim 10, wherein:

the at least one pivot mechanism comprises a guide slot including the first arcuate guide surface;

the guide follower is received within the guide slot; and the guide follower includes a first articulating surface configured to articulate with the first arcuate guide surface.

12. The saw of claim 11, wherein the first articulating surface is an arcuate surface having a second radius of curvature with an origin on the pivot axis.

13. The saw of claim 12, further comprising:

a second arcuate guide surface configured to articulate with a second articulating surface of the guide follower.

14. The table saw of claim 9, wherein the saw is mounted to the at least one support rail by the at least one pivot mechanism.

15. The table saw of claim 9, wherein:

the at least one pivot mechanism comprises a first pivot mechanism and a second pivot mechanism;

a first portion of the first pivot mechanism is fixedly connected to the first support post; and a second portion of a second pivot mechanism is fixedly connected to the second support post.

16. The saw of claim 15, wherein:

the first support post is fixedly connected to the base; and the second support post is fixedly connected to the base.

* * * * *